(12) United States Patent
Riscutia et al.

(10) Patent No.: US 11,308,104 B2
(45) Date of Patent: Apr. 19, 2022

(54) KNOWLEDGE GRAPH-BASED LINEAGE TRACKING

(71) Applicant: Microsoft Technology Licensing, LLC, Redmond, WA (US)

(72) Inventors: Vlad Riscutia, Redmond, WA (US); Isaac James Pattis, Mountlake Terrace, WA (US); Tao Lin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/912,139

(22) Filed: Jun. 25, 2020

(65) Prior Publication Data

US 2021/0406263 A1    Dec. 30, 2021

(51) Int. Cl.
*G06F 16/2458* (2019.01)
*G06F 16/21* (2019.01)
*G06F 16/22* (2019.01)
*G06F 16/901* (2019.01)

(52) U.S. Cl.
CPC ........ *G06F 16/2465* (2019.01); *G06F 16/211* (2019.01); *G06F 16/2282* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 8,856,182 B2 | 10/2014 | Olson | |
| 9,208,223 B1 | 12/2015 | Patil et al. | |
| 9,378,303 B1 | 6/2016 | Meyer et al. | |
| 10,042,836 B1 | 8/2018 | Wang et al. | |
| 10,296,524 B1* | 5/2019 | Tung | ...................... G06N 5/022 |
| 10,997,244 B2 | 5/2021 | Russell et al. | |
| 2003/0212676 A1* | 11/2003 | Bruce | ................ G06F 16/24575 |

(Continued)

OTHER PUBLICATIONS

"Relational database"; FOLDOC: Free Online Dictionary of Computing; published on Jun. 10, 2002; retrieved on Aug. 10, 2021 from http://foldoc.org/relational%20database (Year: 2002).*

(Continued)

*Primary Examiner* — Tony Mahmoudi
*Assistant Examiner* — Umar Mian
(74) *Attorney, Agent, or Firm* — Ray Quinney & Nebeker; Adam K. Richards; Timothy J. Churna

(57) ABSTRACT

A knowledge graph stores connections among tables in a data set and queries used to extract information from the data set. The queries may be used to generate reports. The knowledge graph indicates which of the tables each query uses and indicates which of the queries is used by each table. The knowledge graph may also store schema for the tables and information describing the tables and the queries. A graph builder may generate the knowledge graph by crawling the data set and the queries and by using a query parser to determine the tables each query uses. The graph builder may automatically update the knowledge graph. The graph builder may detect data quality issues in a table of the data set. The graph builder may query the knowledge graph for the queries that use the table. The graph builder may associate notifications with the queries.

20 Claims, 8 Drawing Sheets

(56) References Cited

U.S. PATENT DOCUMENTS

| | | | |
|---|---|---|---|
| 2006/0206612 A1* | 9/2006 | Ferro | G06F 11/3476 709/227 |
| 2007/0260582 A1 | 11/2007 | Liang | |
| 2007/0282804 A1 | 12/2007 | Bowman | |
| 2011/0258212 A1 | 10/2011 | Lu et al. | |
| 2014/0115001 A1 | 4/2014 | Arroyo et al. | |
| 2014/0129583 A1 | 5/2014 | Munkes et al. | |
| 2014/0280307 A1 | 9/2014 | Gupta et al. | |
| 2014/0351261 A1 | 11/2014 | Aswani et al. | |
| 2016/0371395 A1 | 12/2016 | Dumant et al. | |
| 2016/0378851 A1 | 12/2016 | Merdivan et al. | |
| 2017/0371884 A1 | 12/2017 | Vermeulen et al. | |
| 2018/0011903 A1* | 1/2018 | Abolhassani | G06F 16/243 |
| 2018/0052884 A1 | 2/2018 | Kale et al. | |
| 2018/0089328 A1* | 3/2018 | Bath | G06F 16/25 |
| 2018/0107760 A1* | 4/2018 | Saha | G06F 16/24554 |
| 2018/0129690 A1 | 5/2018 | Jagannath et al. | |
| 2018/0210879 A1 | 7/2018 | Mittal et al. | |
| 2018/0210966 A1 | 7/2018 | Bedi et al. | |
| 2018/0349377 A1 | 12/2018 | Verma et al. | |
| 2019/0034811 A1 | 1/2019 | Cuddihy et al. | |
| 2019/0179936 A1* | 6/2019 | Javitt | G06F 16/2365 |
| 2020/0117737 A1 | 4/2020 | Gopalakrishnan et al. | |
| 2020/0210391 A1* | 7/2020 | Scott | G06F 16/2282 |
| 2020/0272623 A1* | 8/2020 | Aggour | G06N 5/02 |
| 2020/0372373 A1* | 11/2020 | Tokarev Sela | G06N 5/02 |
| 2021/0064609 A1 | 3/2021 | Riscutia et al. | |

OTHER PUBLICATIONS

"How to Trace Back the Source Tables Used in the Package", Retrieved From: https://www.bspsoftware.com/knowledgebase/how-to-trace-back-the-source-tables-used-in-the-package/, Retrieved Date: May 20, 2020, 4 Pages.

"Power BI Cleanup Tool; Time Saving with Power BI Helper", Retrieved From: https://radacad.com/power-bi-cleanup-tool-time-saving-with-power-bi-helper, Oct. 12, 2017, 20 Pages.

Fan, et al., "Interactive SQL Query Suggestion: Making Databases User-Friendly", In Proceedings of IEEE 27th International Conference on Data Engineering, Apr. 11, 2011, 12 Pages.

Jayaram, et al., "Querying Knowledge Graphs by Example Entity Tuples", In Journal of Computing Research Repository, Nov. 8, 2013, 16 Pages.

Johnson, et al., "Identifying Object Dependencies", Retrieved From: https://www.informit.com/articles/article.aspx?p=2081570&seqNum=17, Jul. 10, 2013, 2 Pages.

Woods, Dan, "Is the Enterprise Knowledge Graph Finally Going to Make All Data Usable?", Retrieved from: https://www.forbes.com/sites/danwoods/2018/09/19/is-the-enterprise-knowledge-graph-going-to-finally-make-all-data-usable/#7025553d7d39, Sep. 19, 2018, 8 Pages.

Yahya, et al., "Exploratory Querying of Extended Knowledge Graphs", In Proceedings of the VLDB Endowment, vol. 9, Issue 13, Sep. 1, 2016, pp. 1521-1524.

"Application as Filed in U.S. Appl. No. 16/871,747", filed May 11, 2020, 57 Pages.

"International Search Report and Written Opinion Issued in PCT Application No. PCT/US20/037675", dated Aug. 6, 2020, 12 Pages.

Aggour, et al., "Federated Multimodal Big Data Storage & Analytics Platform for Additive Manufacturing", In Proceedings of the IEEE International Conference on Big Data (Big Data), Dec. 9, 2019, pp. 1729-1738.

"International Search Report and Written Opinion Issued in PCT Application No. PCT/US2021/027866", dated Aug. 5, 2021, 13 Pages.

"Non Final Office Action Issued in U.S. Appl. No. 16/557,884", dated Apr. 5, 2021, 17 Pages.

"Notice of Allowance Issued in U.S. Appl. No. 16/557,884", dated Oct. 27, 2021, 16 Pages.

* cited by examiner

KNOWLEDGE GRAPH-BASED LINEAGE TRACKING

CROSS-REFERENCE TO RELATED APPLICATIONS

N/A

BACKGROUND

Data may be stored in a database. A database is an organized collection of data. Retrieving information from the database may involve formulating a query in a query language understood by the database. Queries may extract information from the database for use in reports. An organization may use the reports to identify ways to improve the organization. For example, a database may include information about a business's product sales. The business may use the database to generate reports to identify successful products and weak products.

A database may contain a large amount of data. The data in the database may be complex. The size and complexity of the data may create challenges for tracking which portions of the database contribute different reports. As a result, when a portion of the data experiences a quality issue, it may be difficult to quickly identify the reports that rely on the portion of the data experiencing the issue.

SUMMARY

In accordance with one aspect of the present disclosure, a system is disclosed for automatically tracking connections between data and a set of queries. The system includes one or more processors, memory in electronic communication with the one or more processors, and a data store. The data and the set of queries are stored in the data store. The system also includes instructions stored in the memory. The instructions are executable by the one or more processors to access the data. The data includes discrete subparts that can be accessed using a query. The instructions are also executable by the one or more processors to access the set of queries. Each query in the set of queries uses one or more of the discrete subparts of the data. The instructions are also executable by the one or more processors to generate a knowledge graph based on the data and the set of queries. The knowledge graph indicates, for each query in the set of queries, one or more discrete subparts of the data used by the query and indicates, for each discrete subpart of the data used by the set of queries, one or more queries in the set of queries that use the discrete subpart. The instructions are also executable by the one or more processors to provide a graph query to the knowledge graph. The graph query identifies a particular discrete subpart of the data or a particular query in the set of queries. The instructions are also executable by the one or more processors to receive, in response to the graph query, a response. The response identifies a query in the set of queries that uses the particular discrete subpart of the data or a discrete subpart of the data used by the particular query.

The graph query may identify a first discrete subpart of the data and the response may identify a first query. The instructions may be further executable by the one or more processors to determine, after generating the knowledge graph, that the first discrete subpart of the data has a quality issue. The instructions may also be further executable by the one or more processors to send, after receiving the response, an alert that the first query may be impacted by the quality issue.

The first query may be used to generate a report and the alert identifies the report.

Sending the alert that the first query relies on erroneous data may include sending the alert to one or more users of the report.

The set of queries may include a first query. The graph query may identify the first query. The response may indicate a first set of discrete subparts. The instructions may be further executable by the one or more processors to determine, after generating the knowledge graph, that the first query uses a second set of discrete subparts different from the first set of discrete subparts. The instructions may also be further executable by the one or more processors to modify the knowledge graph based on the second set of discrete subparts.

The instructions may be further executable by the one or more processors to receive, through a user interface, a request regarding a report. A first query from the set of queries may be used in generating the report and the first query uses a set of discrete subparts of the data. The instructions may also be further executable by the one or more processors to provide a second graph query to the knowledge graph. The second graph query may identify the report. The instructions may also be further executable by the one or more processors to receive, in response to the request, a list of the set of discrete subparts of the data.

The instructions may be further executable by the one or more processors to receive, through a user interface, a request regarding a first discrete subpart of the data. The graph query may identify the first discrete subpart and the response may identify a list of queries in the set of queries that use the first discrete subpart. The instructions may also be further executable by the one or more processors to return, in response to the request, the list of queries.

The discrete subparts may include one or more tables stored in the data.

The discrete subparts may include one or more columns of the tables.

The knowledge graph may include schema annotations for the one or more tables and one or more of the schema annotations may be received through a user interface.

The knowledge graph may be structured as a graph database and the graph database may include a node for each query in the set of queries and a node for each of the one or more tables.

The system may further include a second data store. The knowledge graph may be stored on the second data store in a second format different from a first format in which the data is stored on the data store.

The system may further include one or more additional data stores. Additional data and one or more additional sets of queries may be stored in the one or more additional data stores and at least one of the one or more additional data stores store the additional data in a third format different from the first format. The instructions stored in the memory may be further executable by the one or more processors to access the additional data. The additional data may include discrete subparts that can be accessed using a query. The instructions stored in the memory may be further executable by the one or more processors to access the one or more additional sets of queries. Each query in the one or more additional sets of queries may use one or more of the discrete subparts of the additional data. The instructions stored in the memory may also be further executable by the one or more processors to modify the knowledge graph based on the additional data and the one or more additional sets of queries to indicate, for each query in the one or more additional sets of queries, one or more discrete subparts of the additional data used by the query and to indicate, for each discrete subpart of the additional data used by the one or more additional sets of queries, one or more queries in the one or more additional sets of queries that use the discrete subpart.

In accordance with another aspect of the present disclosure, a system is disclosed for monitoring data quality for a report. The system includes one or more processors, memory in electronic communication with the one or more processors, and a first data store that includes data and a set of queries. The data includes discrete subparts that can be accessed using a query. Each query in the set of queries references at least one discrete subpart of the data. The system also includes a second data store. The second data store includes a knowledge graph that indicates, for each query in the set of queries, one or more discrete subparts of the data used by the query and indicates, for each discrete subpart of the data used by the set of queries, one or more queries in the set of queries that use the discrete subpart. The system also includes a user interface showing a business metric. The business metric is based at least in part on a first query from the set of queries and the first query uses a first discrete subpart of the data. The system also includes instructions stored in the memory. The instructions are executable by the one or more processors to access the data as part of an automated check for data quality issues in the data, determine that the first discrete subpart of the data has a quality issue, and provide a graph query to the knowledge graph. The graph query identifies the first discrete subpart. The instructions are also executable by the one or more processors to receive, in response to the graph query, a response indicating that the first discrete subpart is used by the first query and that the business metric is based at least in part on the first query. The instructions are also executable by the one or more processors to associate the quality issue with the business metric.

The knowledge graph may be structured as a graph database.

Associating the quality issue with the business metric may include placing a visual indicator of the quality issue on the user interface.

The user interface may show a second business metric. The second business metric may be based at least in part on a second query from the set of queries and the second query may use the first discrete subpart of the data. The response to the graph query may indicate that the first discrete subpart of the data is used by the second query and that the second business metric is based at least in part on the second query. The instructions may be further executable by the one or more processors to associate the quality issue with the second business metric.

In accordance with another aspect of the present disclosure, a computer-readable medium includes instructions that are executable by one or more processors to cause a computing system to crawl, in a first period of time, data stored on a data store. The data includes one or more tables. The instructions are also executable by one or more processors to cause a computing system to crawl, in the first period of time, a set of queries on the data store. Each query in the set of queries uses at least one of the one or more tables. The instructions are also executable by one or more processors to cause a computing system to generate, during the first period of time, a knowledge graph based on the data and the set of queries. The knowledge graph includes a table entity for each of the one or more tables and a query entity for each query in the set of queries. The knowledge graph indicates connections between table entities and query entities. The instructions are also executable by one or more processors to cause a computing system to identify, at a second time after the first period of time, a change in a first query in the set of queries. The instructions are also executable by one or more processors to cause a computing system to update the knowledge graph based on the change.

Identifying the change may include crawling, at the second time, the set of queries. Identifying the change may also include determining, at the second time, that the first query uses a first set of tables in the one or more tables. Identifying the change may also include receiving, from the knowledge graph, a response indicating that the first query uses a second set of tables in the one or more tables. Identifying the change may also include determining that the first set of tables is different from the second set of tables.

Identifying the change may include receiving a notification that a user has caused the change.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
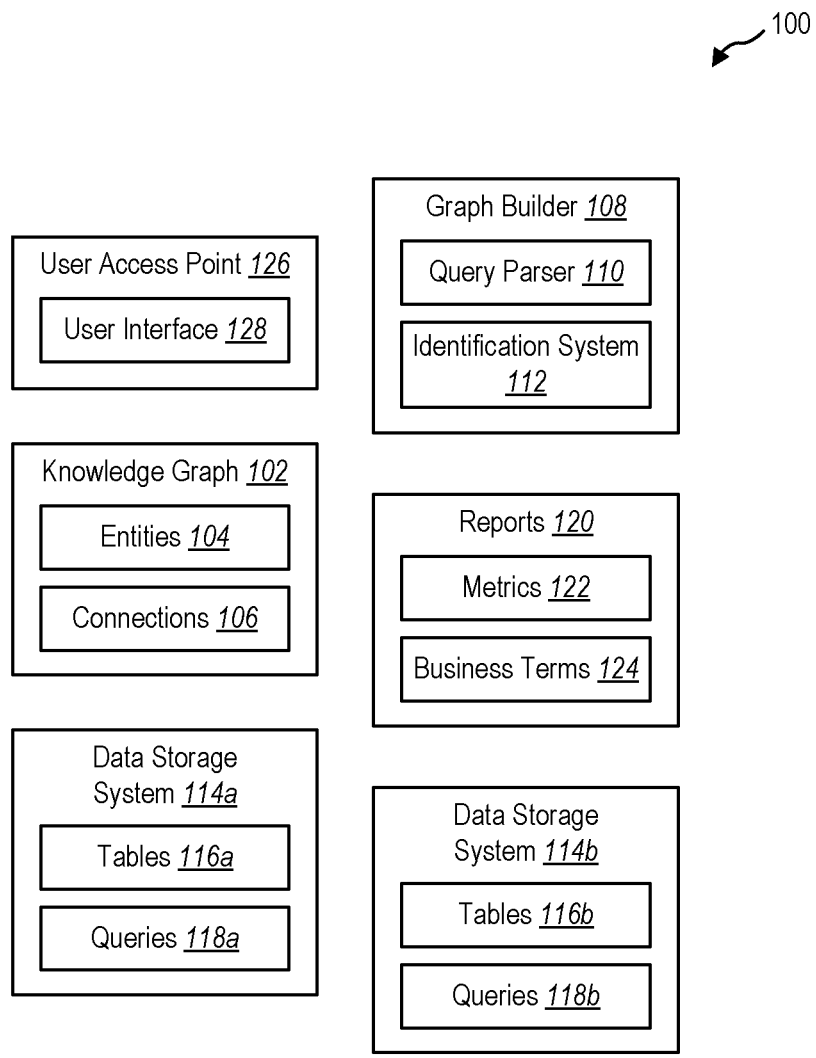
FIG. 1 illustrates an example system for tracking lineage of data used to generate reports.

This disclosure relates generally to systems and methods for improving usability of large data sets used to generate reports. A knowledge graph may be a meta data layer that captures information about underlying data sets. The data sets may include tables. The knowledge graph may describe the tables, where they come from, and what columns in the tables mean. The knowledge graph may describe queries that use the tables to generate reports. The knowledge graph may describe the meaning and significance of the reports. A user interface may allow users to enter information for placing in the knowledge graph. A graph builder may crawl the underlying data sets and queries. The graph builder may extract the tables and parse the queries to determine connections between the tables and the queries. The graph builder may include these connections in the knowledge graph. The knowledge graph may allow an organization to easily determine queries that may be impacted by a data quality issue in the underlying data sets. The knowledge graph may allow a user to see the particular tables that feed a particular report and may store information to help the user more easily understand the meaning of the particular tables and the particular report.

An organization (such as a business enterprise or government entity) may collect large amounts of data. The data may relate to the organization's activities and the activities of individuals connected to the organization. For example, a business organization may collect information about its business activities and about the activities of its customers and clients. The organization may store the data it collects in a data model. One example of a data model is a relational database consisting of multiple tables. The organization may generate reports using the data to understand organizational performance. The reports may be visible to members of the organization through a user interface. Analyzing the data and generating the reports may involve running queries against the data model. The organization may use insights gained from analyzing the data and the reports to better achieve its goals.

Maintaining large amounts of data and generating numerous reports may create challenges for responding to data quality issues. For example, consider an organization that maintains a data model containing 100,000 tables. Assume the organization generates 400 different reports using those 100,000 tables. If the organization discovers that one table in the 100,000 tables has a data quality issue, the organization may not be able to quickly determine which, if any, of the 400 different reports use data from the one table that has the data quality issue.

Similarly, it may be difficult for a user to find out what data contributes to a particular report. Consider again the hypothetical situation described above. Determining which of the 100,000 tables the particular report relies on may be possible. But responding to multiple different requests for multiple different reports may be overly burdensome and time consuming. Moreover, it may be difficult to manually track changes to the tables used for the particular report because the queries used to generate the report change over time.

This disclosure presents an automated solution for tracking connections between reports and underlying data. A knowledge graph stores information about the reports and the underlying data and queries used to generate the reports. The knowledge graph also stores information about the connections among the reports, the queries, and the underlying data. The knowledge graph may be organized according to a data model that allows for fast and efficient determination as to the portions of the data that are used to generate a particular report and the reports that rely on a particular portion of the data. A graph builder may crawl the underlying data and queries to automatically build and update the knowledge graph. The graph builder may use the knowledge graph to automatically identify reports that may have a data quality issue due to an issue in the underlying data.

The graph builder may use a query parser in automatically generating and updating the knowledge graph. The query parser may, in response to receiving a query, determine all tables that the query uses. Any tables accessed in executing the query may be tables that the query uses. For example, the query parser may receive a query used to generate a report. The query parser may determine that the query uses a first table and a second table. The knowledge graph may then store information connecting the report to the first table and the second table. To automatically generate the knowledge graph the query parser may access all the queries used to generate reports and determine, for each query, the tables that the query uses. The query parser may also periodically access the queries and determine whether the tables used by any of the queries have changed. In the alternative, the query parser may receive a notification whenever changes are made to the queries. The query parser may automatically update the knowledge graph based on any changes.

The knowledge graph may facilitate fast and automated responses to data quality issues in the underlying data. For example, a data crawler may discover a data quality issue in one table in the data model. The data crawler may run a query on the knowledge graph to determine any queries and reports that rely on the table. The data crawler may notify users, such as through the user interface, that certain reports may be impacted by the data quality issues.

The knowledge graph may also allow users to see, for any given report, the tables used by the report. For example, the user interface may allow users to select a report. The user interface may run a query on the knowledge graph to determine, in an automated way, the queries used to generate the report and the tables used by the queries. The user interface may display this information to the user.

The knowledge graph may include definitions and descriptions for tables in the data model, queries used to generate reports using the data model, and the reports. Users may provide a query to the knowledge graph with a business term, and the knowledge graph may provide a definition for that business term and identify the queries and tables that relate to that business term.

The knowledge graph allows organizations and users to make better and more efficient use of the organization's data and reports. Users can access information about the meaning of the organization's data and reports. They may receive automatic notifications about specific reports that may be experiencing data quality issues. They can quickly and easily understand the data that feeds a particular report.

FIG. 1 illustrates an example of a system 100 for automatically tracking connections between business data and reports. The system 100 may include data storage systems 114a, 114b, reports 120, a knowledge graph 102, a graph builder 108, and a user access point 126.

The data storage systems 114a, 114b may be any system capable of storing and retrieving electronic information. The data storage systems 114a, 114b may store data. The data storage systems 114a, 114b may store the data in a data storage or data repository. The data storage systems 114a, 114b may store the data in one or more databases. The one or more databases may include a relational database (which may be a collection of data items organized as a set of formally described tables from which data can be easily accessed), an object-oriented database, a hierarchical database, a network database, another type of database, or some combination or extension of the foregoing.

The data stored in the data storage systems 114a, 114b may be organized according to a data model. The data storage system 114a may store data according to a different data model than the data storage system 114b. The data storage systems 114a, 114b may store data according to the same data model. A data model may include discrete subparts. A discrete subpart (which may also be referred to as a discrete subset) may be a portion of the data that can be separately accessed using a query. A discrete subpart may be a portion of the data that can be separately identified. Discrete subparts of the data may include tables, records, objects, and other data structures that are separately identifiable or accessible. Discrete subparts of the data may include subparts of the tables, records, objects, or other data structures. For example, tables may be further organized in columns and rows.

By way of example as to one way in which the data may be organized, the data storage systems 114a, 114b may include tables 116a, 116b. The tables 116a, 116b may include one or more tables. Each of the one or more tables may have an identifier (such as a name) that allows the data storage systems 114a, 114b to separately identify and access each of the one or more tables. Each of the one or more tables in the tables 116a, 116b may be considered a discrete subpart of the data stored in the data storage systems 114a, 114b. The tables 116a, 116b may include one or more columns and one or more rows. Each column of the tables 116a, 116b may have a name and a data type. The name may be a way to separately refer to or access a column. Each column of the tables 116a, 116b may be considered a discrete subpart of the data stored on the data storage systems 114a, 114b. The data type may describe a format of information stored in the column. For example, the data type may be a string or a real number. The one or more rows of the tables 116a, 116b may be records.

The data storage systems 114a, 114b may include management systems. The management systems may control organization, storage, management, and retrieval of the data stored in the data storage systems 114a, 114b. The management systems may receive a request (such as a query) to access a portion of the data and may extract the requested portion of the data. The request may reference (directly or indirectly) one or more discrete subparts of the data (such as one or more tables or one or more columns in the data). Any discrete subpart accessed by the management system in response to the request may be considered to be referenced in the request. Stated another way, the request may cause the management system to use one or more discrete subparts of the data to respond to the request. Any of the discrete subparts used by the management system in executing the request may be considered discrete subparts that the request uses. The request may need to be in a query language that the data storage systems 114a, 114b understand. The data storage systems 114a, 114b may receives queries in the same query language. The data storage system 114a may receive requests in a query language different from a query language used for requests received by the data storage system 114b. Extracting the subset of data may involve joining multiple discrete subparts contained in the data, filtering the data, or performing other operations.

The data storage systems 114a, 114b may include queries 118a, 118b. The queries 118a, 118b may be database queries that the management systems can interpret to obtain specific information stored in the data storage systems 114a, 114b. Executing the queries 118a, 118b may involve performing one or more database operations, such as joining records contained in two or more of the tables 116a, 116b. The queries may be represented using a query language (such as Structured Query Language (SQL)). The queries 118a, 118b may include queries that have been previously received by the management systems. The queries 118a, 118b may include queries that have not been previously received by the management systems. For example, the queries 118a, 118b may include stock or template queries provided by the management systems. As another example, the queries 118a, 118b may include queries generated by a user but that have not yet been executed by the management systems. The queries 118a, 118b may retrieve information used to generate the reports 120.

The queries 118a, 118b may (directly or indirectly) reference one or more discrete subparts of the data. For example, the queries 118a, 118b may reference one or more of the tables 116a, 116b or one or more columns of the tables 116a, 116b. The queries 118a, 118b may cause the management systems to access one or more discrete subparts of the data (such as the tables 116a, 116b). Any of the discrete subparts of the data (such as the tables 116a, 116b) accessed by the management systems in response to the queries 118a, 118b may be considered referenced in the queries 118a, 118b. Stated another way, the queries 118a, 118b may cause the management systems to use one or more discrete subparts of the data to respond to the queries 118a, 118b. Any of the discrete subparts of the data used by the management systems in response to the queries 118a, 118b may be considered to be discrete subparts of the data that the queries 118a, 118b use.

The reports 120 may be physical documents or electronic information. For example, the reports 120 may be displayed as part of the user access point 126. The reports 120 may be stored in a data store, such as the data storage systems 114a, 114b. The reports 120 may include or present information useful for understanding data the organization has collected or for evaluating organizational performance. The reports 120 may include metrics 122. The metrics 122 may be measurable values used to track organizational performance. The metrics 122 may be a quantifiable measure of progress toward an organizational goal or progress in a particular process. The metrics 122 may indicate whether an organization has achieved certain goals. The metrics 122 may be key performance indicators. By way of example, the metrics 122 may include active user accounts as of a certain date or during a certain period, web traffic statistics, incremental sales, return on marketing investment, response rates, content downloads, sales revenue, sales growth, profit margin, debt to equity ratio, customer retention rate, and social media followers. The queries 118a, 118b may be used to generate the metrics 122 included in the reports 120.

The reports 120 may include business terms 124. The business terms 124 may be titles of the reports 120. The business terms 124 may be associated with the metrics 122. The business terms 124 may be labels for the metrics 122. For example, a report may include a first metric and a second metric. The first metric may be labeled "Current Active User Accounts," and the second metric may be labeled "Average Length of Tenure of Current Active User Accounts." Those labels may be considered business terms. The business terms 124 may also include terms mentioned in the reports 120 that are not directly associated with the metrics 122.

The knowledge graph 102 may be a database of information about the data, the queries 118a, 118b, and the reports 120. The knowledge graph 102 may be stored on a data store separate from the data storage systems 114a, 114b. The knowledge graph 102 may be organized according to a different data model than the data stored on the data storage systems 114a, 114b. The knowledge graph 102 may receive and respond to graph queries. A graph query may identify a query, a report (including a business term or a metric), or a discrete subpart of the data.

With respect to the data, the knowledge graph 102 may include information describing the data. The knowledge graph 102 may include information describing a business significance of the data and discrete subparts of the data. For example, the knowledge graph 102 may include information describing the meaning of one or more tables in the tables 116a, 116b. The knowledge graph 102 may include information describing the meaning of one or more columns of the tables 116a, 116b. The tables 116a, 116b and their columns may have names and identifiers that convey little or no information about the significance of the tables 116, 116b and their columns. The information describing the tables 116a, 116b and their columns that is stored in the knowledge graph 102 may help a user better understand the type of information stored in the tables 116a, 116b and their columns, the source of that information, and how that information is useful to the organization.

The knowledge graph 102 may include information about connections between discrete subparts of the data and one or more of the queries 118a, 118b. The knowledge graph 102 may indicate which of the queries 118a, 118b use a particular discrete subpart of the data. For example, consider that the data includes a first table that is referenced in a first query and in a second query. The knowledge graph 102 may include information indicating that the first table is used by the first query and the second query. That information may allow the knowledge graph 102 to identify the first query and the second query based on a graph query identifying the first table. That information may also allow the knowledge graph 102 to identify the first table based on a graph query identifying the first query or the second query.

The knowledge graph 102 may include links to the data stored on the data storage systems 114a, 114b.

With respect to the queries 118a, 118b, the knowledge graph 102 may include information describing the queries 118a, 118b. The knowledge graph 102 may include information describing a business significance of an output of the queries 118a, 118b. For example, a first query in the queries 118a, 118b may return an average number of page visits per day for the last 30 days. The knowledge graph 102 may include that information and associate it with the first query.

The knowledge graph 102 may include information indicating connections between the queries 118a, 118b and the reports 120. The knowledge graph 102 may indicate which of the reports 120 are based on a particular query in the queries 118a, 118b. For example, consider that the queries 118a, 118b include a first query that is used to generate a first report in the reports 120. The knowledge graph 102 may include information indicating that the first query is used to generate the first report. That information may allow the knowledge graph 102 to identify the first report in response to a graph query identifying the first query. Similarly, that information may allow the knowledge graph 102 to identify the first query in response to a graph query identifying the first report.

The knowledge graph 102 may include information indicating connections among the queries 118a, 118b and discrete subsets of the data (the terms discrete subparts and discrete subsets may be used interchangeably). The knowledge graph 102 may include information indicating which discrete subsets of the data each of the queries 118a, 118b use. For example, a first query may use a first table and a second table in the data. The knowledge graph 102 may include information indicating that the first query uses the first table and the second table. That information may allow the knowledge graph 102 to identify the first table and the second table in response to a graph query identifying the first query. That information may allow the knowledge graph 102 to identify the first query in response to a graph query identifying the first able or the second table.

The knowledge graph 102 may include links to the queries 118a, 118b stored on the data storage systems 114a, 114b.

With respect to the reports 120, the knowledge graph 102 may include information describing the reports 120, the business terms 124, and the metrics 122. The knowledge graph 102 may include information describing a business significance of or a business meaning of the reports 120, the business terms 124, and the metrics 122.

The knowledge graph 102 may include information indicating connections between the reports 120, the business terms 124, and the metrics 122 on the one hand and the queries 118a, 118b or the data on the other hand. The knowledge graph 102 may include information indicating the queries 118a, 118b used to generate a particular report or metric. For example, a report may include an active user accounts metric. The metric may be determined using a first query and a second query. The knowledge graph 102 may include information indicating that the metric (and the report) is generated using the first query and the second query. That information may allow the knowledge graph 102 to identify the first query and the second query based on a graph query identifying the metric (or the report). Similarly, that information may allow the knowledge graph 102 to identify the metric (or the report) based on a graph query identifying the first query or the second query. As another example, a business term may describe the results of a first query in the queries 118a, 118b. The knowledge graph 102 may include information indicating a connection between the business term and the first query. The knowledge graph 102 may also include information indicating all the discrete subparts of the data used by the first query. In this way, the knowledge graph 102 can trace a business term back to all the data that contributes to the business term.

The knowledge graph 102 may include links to the reports 120, which may be stored on the data storage systems 114a, 114b.

The knowledge graph 102 may include information indicating connections between the reports 120 and the discrete subsets of the data used to generate the reports 120 (or the metrics 122 in the reports 120). For example, assume a report is generated using a first query and a second query. Further assume the first query references a first table, a second table, and a third table and the second query references a fourth table. The information in the knowledge graph 102 connecting the data, the queries 118a, 118b, and the reports 120 may connect the first table, the second table, and the third table to the report through the first query. Similarly, the information in the knowledge graph 102 connecting the data, the queries 118a, 118b, and the reports 120 may connect the report to the first table, the second table, and the third table through the first query. The information in the knowledge graph 102 connecting the data, the queries 118a, 118b, and the reports 120 may connect the fourth table to the report through the second query. Similarly, the information in the knowledge graph 102 connecting the data, the queries 118a, 118b, and the reports 120 may connect the report to the fourth table through the second query. The information in the knowledge graph 102 connecting the data, the queries 118a, 118b, and the reports 120 may allow the knowledge graph 102 to identify the report in response to a graph query identifying any of the first table, the second table, the third table, or the fourth table. Similarly, the information in the knowledge graph 102 connecting the data, the queries 118a, 118b, and the reports 120 may allow the knowledge graph 102 to identify the first table, the second table, the third table, and the fourth table based on a graph query identifying the report.

As noted above, the knowledge graph 102 may receive graph queries that identify a discrete subpart of the data, a query, or a report. The knowledge graph 102 may provide responses to the graph queries. A response may indicate queries or reports, if any, that use a discrete subpart of the data identified in the graph query. The response may indicate discrete subparts of the data used by a query or a report identified in the graph query. The response may indicate reports that use a query identified in the graph query. The response may indicate queries used to generate a report identified in the graph query.

One way in which information in the knowledge graph 102 may be organized is shown in FIG. 1. The knowledge graph 102 may include entities 104 and connections 106.

The entities 104 may include information about data stored on the data storage systems 114a, 114b. For examples, the entities 104 may include information about the tables 116a, 116b, such as the meaning of the information stored in the tables 116a, 116b and sources of the information stored in the tables 116a, 116b. The entities 104 may include information about schema of the tables 116a, 116b. The schema of the tables 116a, 116b may be the names and data types of the columns of the tables 116a, 116b. The entities 104 may include schema annotations. The schema annotations may describe the meaning of information stored in the columns of the tables 116a, 116b. The schema annotations may describe the significance of the information stored in the columns of the tables 116a, 116b to the business. The entities 104 may include pointers or links to specific data in the data storage systems 114a, 114b.

Discrete subparts of the data may have associated entities in the entities 104. For example, a table in the tables 116a, 116b may have an associated table entity in the entities 104. The table entity may include a description of what the information in the table means and where it comes from. The table entity may include schema of the table. Thus, the table entity may include the names and data types of the columns of the table. The table entity may also include schema annotations. The entity may include a pointer or a link to the table. Each table in the tables 116a, 116b may have an associated table entity. In the alternative, fewer than all the discrete subparts of the data may have an associated entity. For example, only tables that are used by queries in the queries 118a, 118b may have associated entities in the entities 104. In some designs, columns of the tables 116a, 116b may have associated entities in the entities 104.

Queries in the queries 118a, 118b may have associated entities in the entities 104. For example, a query in the queries 118a, 118b may have an associated query entity in the entities 104. The query entity may include information about what the query is trying to accomplish. The query entity may include information about reports that use the query. The query entity may include information about the meaning or significance of reports that use the query. The query entity may include a pointer or a link to the query. Each query in the queries 118a, 118b may have an associated query entity. In the alternative, fewer than all the queries 118a, 118b may have an associated query entity.

Reports in the reports 120 may have associated entities in the entities 104. For example, a report in the reports 120 may have an associated report entity in the entities 104. The report entity may include information about a meaning or significance of the report or any metrics or business terms included in the report. The report entity may include a pointer or a link to the report. Each report in the reports 120 may have an associated report entity. In some designs, the metrics 122 and the business terms 124 may have associated entities. Those entities may include information describing the meaning of the metrics 122 or the business terms 124.

The connections 106 may include information about relationships among the data stored on the data storage systems 114a, 114b, the queries 118a, 118b, and the reports 120. The connections 106 may indicate relationships among discrete subparts of the data stored on the data storage systems 114a, 114b, the queries 118a, 118b, and the reports 120 by connecting the entities 104. For example, the connections 106 may indicate which of the tables 116a, 116b are used by a particular query in the queries 118a, 118b. The connections 106 may indicate which of the queries 118a, 118b use a particular table in the tables 116a, 116b. The connections 106 may indicate which of the reports 120 are generated using a particular query in the queries 118a, 118b. The connections 106 may indicate which of the queries 118a, 118b generate a particular report in the reports 120. The connections 106 may indicate which of the tables 116a, 116b are used to generate a particular report in the reports 120. The connections 106 may indicate which of the reports 120 are generated using a particular table in the tables 116a, 116b. The connections 106 may indicate which of the tables 116a, 116b, queries 118a, 118b, and reports 120 relate to a specific business term in the business terms 124.

The graph builder 108 may automatically (and without human intervention) build and update the knowledge graph 102. The graph builder 108 may access the data storage systems 114a, 114b to build and update the knowledge graph 102. The graph builder 108 may crawl the data stored on the data storage systems 114a, 114b, the queries 118a, 118b, and the reports 120. The graph builder 108 may use the data (which may include the tables 116a, 116b), the queries 118a, 118b, and the reports 120 to determine relationships among the data, the queries 118a, 118b, and the reports 120 and store those relationships in the knowledge graph 102 (such as in the connections 106). The graph builder 108 may use the data (which may include the tables 116a, 116b), the queries 118a, 118b, and the reports 120 to create the entities 104 and the connections 106. For example, the graph builder 108 may crawl the data storage system 114a. The tables 116a may include a first table, and the queries 118a may include a first query that uses the first table. The graph builder 108 may identify the first table and collect a schema of the first table. The graph builder 108 may generate a first table entity associated with the first table. The graph builder 108 may include the schema of the first table in the first table entity. The graph builder 108 may identify the first query and generate a first query entity associated with the first query. The graph builder 108 may determine, based on the first query, that the first query uses the first table. The graph builder 108 may generate a first connection indicated a relationship between the first query and the first table. The first connection may indicate that the first query uses the first table. The first connection may indicate that the first table is used by the first query.

After building the knowledge graph 102, the graph builder 108 may periodically crawl the data, the queries 118a, 118b, and the reports 120. The knowledge graph 102 may crawl the data, the queries 118a, 118b, and the reports 120 on a predetermined schedule, in response to a user request, in response to a notification about a change to the data, the queries 118a, 118b, or the reports 120, or in response to a notification about an issue with respect to the data, the queries 118a, 118b, or the reports 120. The graph builder 108 may identify changes to the data, the queries 118a, 118b, and the reports 120. The graph builder 108 may use the knowledge graph 102 to determine whether the data, the queries 118a, 118b, or the reports 120 have changed. The graph builder 108 may update the knowledge graph 102 based on changes to the data, the queries 118a, 118b, and the reports 120. For example, the graph builder 108 may crawl the data storage system 114a at a time after having created the knowledge graph 102. The knowledge graph 102 may indicate that a first table is used by a first query. The graph builder 108 may identify the first query and determine that the first query no longer uses the first table and now uses a second table. The graph builder 108 may modify the knowledge graph 102 to indicate that the first query uses the second table and that the second table is used by the first query. The graph builder 108 may also modify the knowledge graph 102 such that it no longer indicates that the first query uses the first table or that the first table is used by the first query. In doing so, the graph builder 108 may modify the connections 106 of the knowledge graph 102. For example, the graph builder 108 may delete a connection between the first query and the first table. As another example, the graph builder 108 may determine that a second schema of a first table is different from a first schema of the first table indicated in the knowledge graph 102. The graph builder 108 may modify the entities 104 of the knowledge graph such that they show the second schema for the first table.

The graph builder 108 may include a query parser 110. The query parser 110 may obtain or receive a query (such as a query included in the queries 118a, 118b) and determine which discrete subparts of the data (such as which of the tables 116a, 116b) stored on the data storage system 114a, 114b the query uses. The graph builder 108 may use the query parser 110 to generate the connections 106. The graph builder 108 may use the query parser 110 to identify changes between a set of tables a query currently uses and a previous set of tables the query previously used as indicated in the knowledge graph 102.

The graph builder 108 may include a notification system 112. The notification system 112 may provide an alert regarding any changes detected between the data and the queries 118a, 118b stored in the data storage systems 114a, 114b and the information stored in the entities 104 or the connections 106 of the knowledge graph 102. The notification system 112 may provide the alert through the user access point 126 or directly to users. For example, the graph builder 108 may crawl the data storage system 114b at a time after having generated the knowledge graph 102. The graph builder 108 may detect, based on the knowledge graph 102, that a column has been removed from the first table. The notification system 112 may provide a graph query to the knowledge graph 102 requesting identification of any queries or reports that use the first table. In response to the graph query, the knowledge graph 102 may provide a list of queries and reports that use the first table. The notification system 112 may associate an alert with any of the queries 118b or the reports 120 identified by the knowledge graph 102. The alert may appear in the reports 120. The alert may appear on the user access point 126. The alert may be sent directly to users associated with the reports 120 or the queries that use the first table. As another example, the graph builder 108 may crawl the data storage system 114b at a time after having generated the knowledge graph 102. The graph builder 108 may detect, based on the knowledge graph 102, that a first query previously used a first table but now uses a second table. The notification system 112 may provide a graph query to the knowledge graph 102 requesting identification of any reports that use the first query. The knowledge graph 102 may, in response to the graph query, provide a list of reports. The notification system 112 may associate an alert with any of the reports 120 that use the first query. The alert may appear in the reports 120. The alert may appear on the user access point 126. The alert may be sent directly to users associated with the reports 120 or the first query.

The notification system 112 may provide an alert regarding any queries in the queries 118a, 118b that access a table in the tables 116a, 116b that has a quality issue. For example, the graph builder 108 may receive a notification that the data has a quality issue in a first table. In the alternative, the graph builder 108 may use a data quality check to determine that the data has a quality issue in the first table. In response to the notification or the determination, the notification system 112 may provide a graph query to the knowledge graph 102 requesting identification of all queries and reports that use the first table. The knowledge graph 102 may provide a list of queries and reports in response to the graph query. The notification system 112 may associate an alert with any queries and reports in the list of queries identified by the knowledge graph 102.

The user access point 126 may allow a human to interact with the knowledge graph 102 through a user interface 128. The user interface 128 may allow users to input information into the knowledge graph 102. For example, a user may use the user interface 128 to input schema annotations into the knowledge graph 102. As another example, a user may input definitions for the business terms 124 or the metrics 122. As another example, a user may input information about the tables 116a, 116b or the queries 118a, 118b through the user interface 128. Users may modify the queries 118a, 118b and the reports 120 through the user interface 128. Users may request that the graph builder 108 update the knowledge graph 102 through the user interface 128. Users may view the reports 120 through the user interface 128. Users may create and define reports and metrics (such as the reports 120 and the metrics 122) using the user interface 128. Users may modify reports and metrics (such as the reports 120 and the metrics 122) using the user interface 128. Users may define and modify which queries are used to create a report or a metric. Users may define and modify the queries used to create a report or a metric.

Users may view information contained in the knowledge graph 102 through the user interface 128. A user may view descriptions and annotations associated with the tables 116a, 116b, the queries 118a, 118b, or the reports 120 through the user interface 128. A user may request information about connections among the tables 116a, 116b, the queries 118a, 118b, and the reports 120 through the user interface 128. A user may receive responses to queries on the knowledge graph 102 through the user interface 128. The responses to queries may include information about connections. The responses to queries may include descriptions and annotations associated with discrete subparts, queries, or reports identified in the queries or in the responses.

Figure 2:
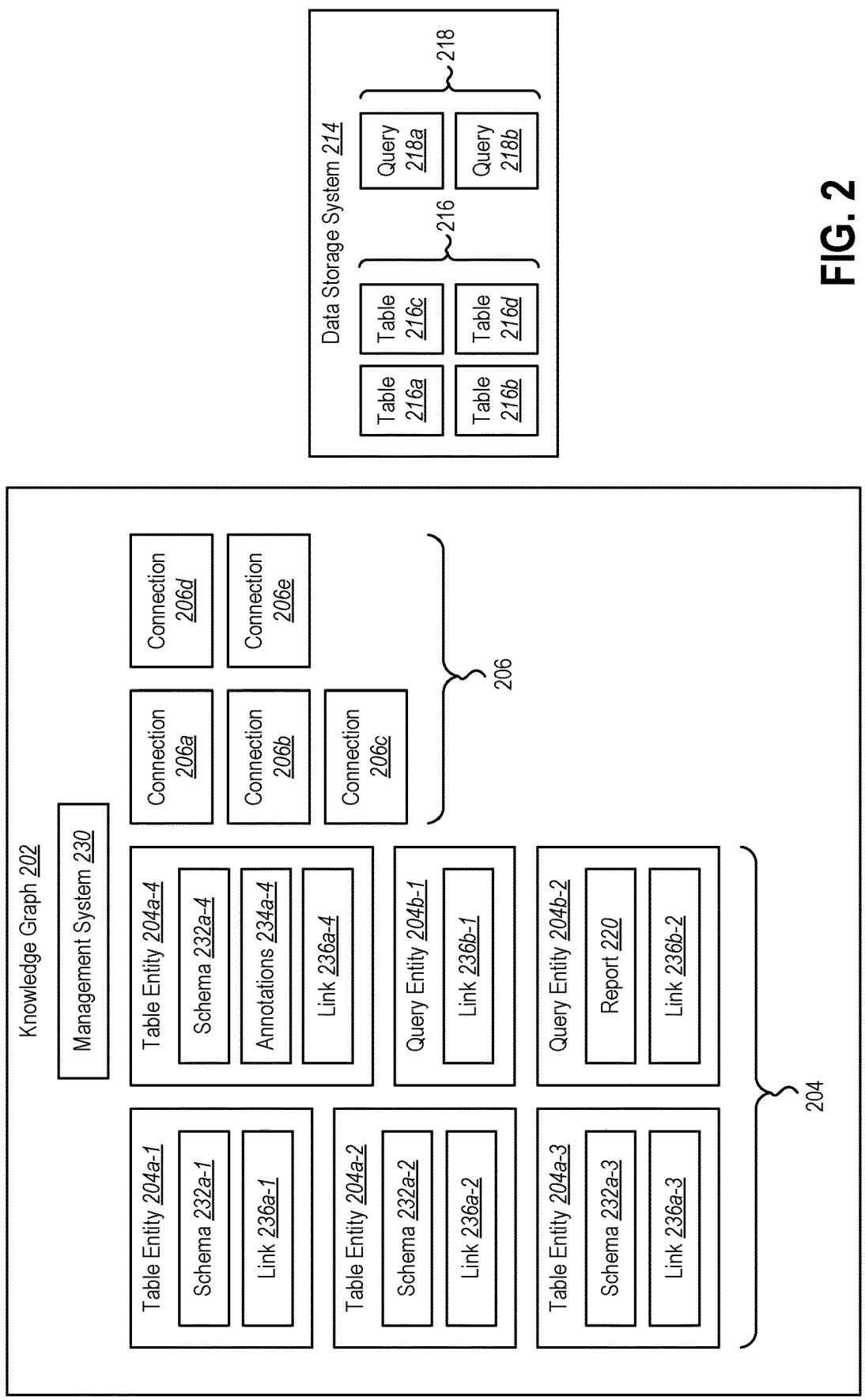
FIG. 2 illustrates an example knowledge graph used to track connections between queries and data.

FIG. 2 illustrates an example data storage system 214 and an example knowledge graph 202.

The data storage system 214 may include data. The data may be organized into tables 216. The tables 216 may include table 216a, table 216b, table 216c, and table 216d. Each of the tables 216a-d may include columns. The columns may have names and data types.

The data storage system 214 may include queries 218. The queries 218, when executed by the data storage system 214, may cause the data storage system 214 to extract a subset of the data stored on the data storage system 214. Executing the queries 218 may include performing one or more operations on one or more of the tables 216. For example, query 218a may use the table 216a, the table 216c, and the table 216d, and query 218b may use the table 216c and the table 216d.

The knowledge graph 202 may include information about the tables 216 and the queries 218 and relationships between the tables 216 and the queries 218. A graph builder (such as the graph builder 108) may construct the knowledge graph 202 by crawling the data storage system 214 and identifying the tables 216 and the queries 218. The graph builder may use a query parser (such as the query parser 110) to determine which tables in the tables 216 each of the queries 218 use.

The knowledge graph 202 may include entities 204 and connections 206. The entities 204 may correspond to the queries 218 and discrete subparts of the data (such as the tables 216) stored on the data storage system 214. The connections 206 may represent relationships among the entities 204. Although FIG. 2 shows the knowledge graph 202 organized with the entities 204 and the connections 206, the knowledge graph 202 may be organized and structured according to a different model, organization, or structure.

Table entity 204a-1 may correspond to the table 216a. The graph builder may generate the table entity 204a-1 when the graph builder identifies the table 216a. The graph builder may extract the column names and data types stored in the table 216a and add them to the table entity 204a-1 in schema 232a-1. The graph builder may add link 236a-1 to the table entity 204a-1. The link 236a-1 may be a link to the table 216a. The table entity 204a-1 may include a description of the meaning of the table 216a and the source of the data included in the table 216a.

Table entity 204a-2 may correspond to the table 216b. The graph builder may generate the table entity 204a-2 when the graph builder identifies the table 216b. The graph builder may extract the column names and data types stored in the table 216b and add them to the table entity 204a-2 in schema 232a-2. The graph builder may add link 236a-2 to the table entity 204a-2. The link 236a-2 may be a link to the table 216b. The table entity 204a-2 may include a description of the meaning of the table 216b and the source of the data included in the table 216b.

Table entity 204a-3 may correspond to the table 216c. The graph builder may generate the table entity 204a-3 when the graph builder identifies the table 216c. The graph builder may extract the column names and data types stored in the table 216c and add them to the table entity 204a-3 in schema 232a-3. The graph builder may add link 236a-3 to the table entity 204a-3. The link 236a-3 may be a link to the table 216c. The table entity 204a-3 may include a description of the meaning of the table 216c and the source of the data included in the table 216c.

Table entity 204a-4 may correspond to the table 216d. The graph builder may generate the table entity 204a-4 when the graph builder identifies the table 216d. The graph builder may extract the column names and data types stored in the table 216d and add them to the table entity 204a-4 in schema 232a-4. The graph builder may add link 236a-4 to the table entity 204a-4. The link 236a-4 may be a link to the table 216d. The table entity 204a-4 may include annotations 234a-4. A user may add the annotations 234a-4 using a user interface. The annotations 234a-4 may describe a significance of one or more column names identified in the schema 232a-4. The table entity 204a-4 may include a description of the meaning of the table 216d and the source of the data included in the table 216d.

Query entity 204b-1 may correspond to the query 218a. The graph builder may generate the query entity 204b-1 when the graph builder identifies the query 218a. The graph builder may add link 236b-1 to the query entity 204b-1. The link 236b-1 may be a link to the query 218a. The query entity 204b-1 may include a description of the query 218a and a description of the data the query 218a obtains. The query entity 204b-1 may include business term definitions related to the query 218a.

The graph builder may use the query parser to determine, based on the query 218a, tables used by the query 218a. The query parser may determine that the query 218a uses the table 216a, the table 216c, and the table 216d. Based on that determination, the graph builder may generate connection 206a, connection 206b, and connection 206c. The connection 206a may show a relationship between the query entity 204b-1 and the table entity 204a-1. That relationship may indicate that the query 218a uses the table 216a and that the table 216a is used by the query 218a. In other designs, the relationship may indicate only that the query 218a uses the table 216a. The connection 206b may show a relationship between the query entity 204b-1 and the table entity 204a-3. That relationship may indicate that the query 218a uses the table 216c and that the table 216c is used by the query 218a. The connection 206c may show a relationship between the query entity 204b-1 and the table entity 204a-4. That relationship may indicate that the query 218a uses the table 216d and that the table 216d is used by the query 218a.

Query entity 204b-2 may correspond to the query 218b. The graph builder may generate the query entity 204b-2 when the graph builder identifies the query 218b. The graph builder may add link 236b-2 to the query entity 204b-2. The link 236b-2 may be a link to the query 218b. The query entity 204b-2 may include a description of the query 218b and a description of the data the query 218b obtains. The query entity 204b-2 may include business term definitions related to the query 218b.

The graph builder may use the query parser to determine, based on the query 218b, tables used by the query 218b. The query parser may determine that the query 218b uses the table 216c and the table 216d. Based on that determination, the graph builder may generate connection 206d and connection 206e. The connection 206d may show a relationship between the query entity 204b-2 and the table entity 204a-3. That relationship may indicate that the query 218b uses the table 216c and that the table 216c is used by the query 218b. The connection 206e may show a relationship between the query entity 204b-2 and the table entity 204a-4. That relationship may indicate that the query 218b uses the table 216d and that the table 216d is used by the query 218b. The query entity 204b-2 may include report 220. The report 220 may specify a particular report that uses the query 218b. In the alternative, it may be that the query 218b is the report 220.

The knowledge graph 202 may include entities other than those shown. For example, the knowledge graph 202 may include entities for reports, business terms, or metrics. The knowledge graph 202 may include connections indicating relationships among entities representing the reports, the business terms, the metrics, the tables 216, and the queries 218.

In the knowledge graph 202, the connections 206 may be undirected connections. In other designs, the connections 206 may be directed connections. Thus, for example, a knowledge graph may include a connection showing that a query uses a table and may include a separate connection showing that the table is relied on by the query. In other designs, the connections 206 may indicate multiple relationships.

The knowledge graph 202 may include a management system 230. The management system 230 may receive graph queries. A graph query may be a request for information contained in the knowledge graph 202. A graph query may request a list of queries or reports that use a particular table. For example, a graph query may request a list of queries that rely on the table 216c. The management system 230 may access the knowledge graph 202 and search the knowledge graph 202 for connections that identify the table 216c. The management system 230 may locate the connection 206b and the connection 206d. The management system 230 may determine from the connection 206b and the connection 206d that the query 218a and the query 218b use the table 216c. The management system 230 may return, in response to the graph query, a list of the query 218a and the query 218b.

A graph query may request a list of tables that are used by a particular report or a particular query. For example, a graph query may request a list of tables that are used by the query 218b. The management system 230 may access the knowledge graph 202 and search for connections that identify the query 218b. The management system 230 may locate the connection 206d and the connection 206e. The management system 230 may determine from the connection 206d and the connection 206e that the table 216c and the table 216d are used by the query 218b. The management system 230 may return, in response to the graph query, a list of the table 216c and the table 216d.

The graph builder may update or modify the knowledge graph 202 in response to changes to the tables 216 or the queries 218. The graph builder may crawl the data storage system 214 to detect changes. The graph builder may crawl the data storage system 214 based on a schedule, in response to receiving a notification about a change, or in response to a request to detect changes. The following is an example of how the graph builder may update or modify the knowledge graph 202. The graph builder may crawl the queries 218 and, using the query parser, determine that the query 218a uses the table 216a, the table 216b, the table 216b, and the table 216d. The graph builder may query the knowledge graph 202 for a list of tables used by the query 218a and compare that list to what the query parser determined. The graph builder may determine that the query 218a uses a set of tables different from what is indicated in the knowledge graph 202. In response to detecting the change to the query 218a, the graph builder may generate another connection that indicates a relationship between the query 218a and the table 216b. As another example, the graph builder may detect a change to the query 218b if the query 218b no longer uses the table 216c. In response to detecting the change to the query 218b, the graph builder may delete the connection 206d because there is no longer a relationship between the query 218b and the table 216c. As another example, the graph builder may determine that a schema of the table 216a has changed from what is indicated in the knowledge graph 202 (e.g., the table 216a includes a column not included in the schema 232a-1). The graph builder may modify the schema 232a-1 based on the change. (Descriptions of the graph builder modifying or updating the knowledge graph 202 may include the graph builder causing the management system 230 to modify the knowledge graph 202.)

The graph builder may monitor the data storage system 214 for data quality issues. The graph builder may crawl the data storage system 214 to identify data quality issues. The graph builder may crawl the data storage system 214 based on a schedule, in response to receiving a notification about a data quality issue, or in response to a request to detect data quality issues. As one example of how the graph builder may respond to a data quality issue, consider that the graph builder detects a data quality issue in the table 216d. The graph builder may query the knowledge graph 202 for a list of queries that use the table 216d. The knowledge graph 202 may provide a response indicating that the query 218a and the query 218b use the table 216d. The response may also indicate that the report 220 uses the table 216d. The graph builder may provide a notification that the query 218a, the query 218b, and the report 220 may have a data quality issue. The notification may appear on a user interface. The notification may be associated with the report 220.

The graph builder may receive notifications of changes to the tables 216 or the queries 218. The notifications may include information about the changes or the data quality issues. The graph builder may update or modify the knowledge graph 202 directly in response to the notifications. The graph builder may receive notifications of data quality issues.

The knowledge graph 202 may be stored in a format that is optimized or suited for retrieving information from the knowledge graph 202 while the tables 216 may be stored in a different way that is optimized or suited for retrieving information from the tables 216. The knowledge graph 202 may be stored on a first data store different from a second data store on which the tables 216 are stored. The first data store may be optimized for storing and querying the knowledge graph 202.

The knowledge graph 202 may be structured according to a graph database model. In mathematical terms, a graph may be a collection of elements. These elements, which may be referred to as nodes (or vertices), may be joined together by links (or edges). For example, in FIG. 2, the entities 204 may be nodes and the connections 206 may be edges. Nodes and links may have associated properties. Each node may represent an entity to which information can be attached (such as one of the tables 216a-d). Links connect nodes to other nodes, and each link may represent a relationship between connected entities. Properties represent particular information about nodes or links. Data related to the nodes may be stored as properties of the nodes, whereas data related to the links may be stored as properties of the links.

Information that may be represented as a graph may be stored in a graph database. A graph database may be a type of database in which one or more graphs are used to model the structural relationships between data objects in data. The knowledge graph 202 may be stored in a graph database. Graph databases may enable users to leverage complex and dynamic relationships in highly connected data (i.e., data whose interpretation and value requires an understanding of the ways in which its constituent elements are related). Graph databases allow simple and fast retrieval of complex hierarchical structures that may be difficult to model in relational systems. With relational databases, join-intensive query performance tends to deteriorate as the dataset gets larger. In contrast, with a graph database, performance tends to remain relatively constant, even as the dataset grows. This may be because queries of graph databases are typically localized to a portion of the graph. As a result, the execution time for each query may be proportional only to the size of the part of the graph that was traversed to satisfy the query, rather than the size of the overall graph. Graph databases are increasingly being used to model large, complicated datasets. A graph model may be the most effective way to represent lineage connections among discrete subsets of a large set of data and a large number of queries.

The data storage system 214 may store data according to a relational database.

The knowledge graph 202 may improve an organization's ability to leverage and manage large data sets used to generate reports. Annotations and descriptions stored in the knowledge graph 202 may allow users to better understand the meaning of various reports, queries, and data. The knowledge graph 202 may facilitate an automated process for notifying users of reports of data quality issues. As a result, the organization may be less likely to rely on bad information in making business decisions. The knowledge graph 202 may allow organizations to evaluate whether certain subparts of its data are being used for any reports. If not, the organization may stop collecting and storing that data and thereby reduce unnecessary overhead and expense.

Figure 3:
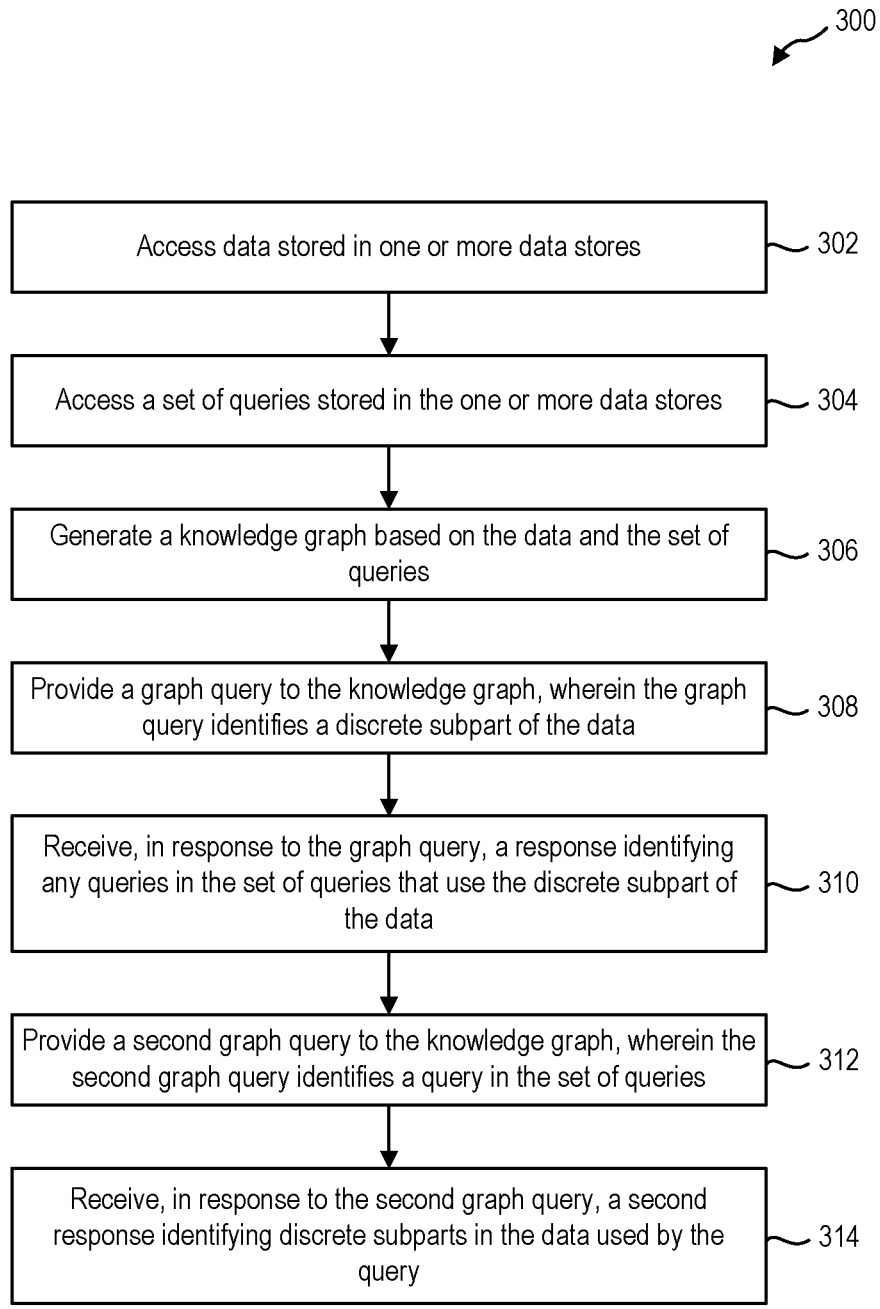
FIG. 3 illustrates an example method for querying a knowledge graph for connections between queries and data.

FIG. 3 illustrates an example method 300 for determining data lineage using a knowledge graph.

The method 300 may include accessing 302 data stored in one or more data stores. The data may be organized into discrete subparts. The discrete subparts may be tables. Accessing 302 the data stored in the one or more data stores may include crawling the data to identify the discrete subparts of the data. Crawling the data may include identifying the tables included in the data and extracting schemas for the tables.

The method 300 may include accessing 304 a set of queries stored in the one or more data stores. Each query in the set of queries may be used to extract a subset of the data stored in the one or more data stores. Each query in the set of queries may use one or more of the discrete subparts of the data.

The method 300 may include generating 306 a knowledge graph based on the data and the set of queries. Generating 306 the knowledge graph may include generating and storing entities associated with at least some discrete subparts of the data and at least some queries in the set of queries. Generating 306 the knowledge graph may include storing information about schema of the discrete subparts of the data. Generating 306 the knowledge graph may include using a query parser to determine, for each query in the set of queries, which discrete subparts of the data the query uses. Generating 306 the knowledge graph may include storing connections in the knowledge graph indicating, for each query in the set of queries, any discrete subparts of the data the query uses.

The method 300 may include providing 308 a graph query to the knowledge graph, wherein the graph query identifies a discrete subpart of the data.

The method 300 may include receiving 310, in response to the graph query, a response identifying any queries in the set of queries that use the discrete subpart of the data. The knowledge graph may, in response to the graph query, search the knowledge graph for connections that identify the discrete subpart of the data. The knowledge graph may determine queries identified in those connections. The knowledge graph may identify the determined queries in the response.

The method 300 may include providing 312 a second graph query to the knowledge graph, wherein the second graph query identifies a query in the set of queries.

The method 300 may include receiving 314, in response to the second graph query, a second response identifying discrete subparts in the data used by the query. The knowledge graph may, in response to the graph query, search the knowledge graph for connections that identify the query. The knowledge graph may determine discrete subparts of the data identified in those connections. The knowledge graph may identify the determined discrete subparts of the data in the response.

Figure 4:
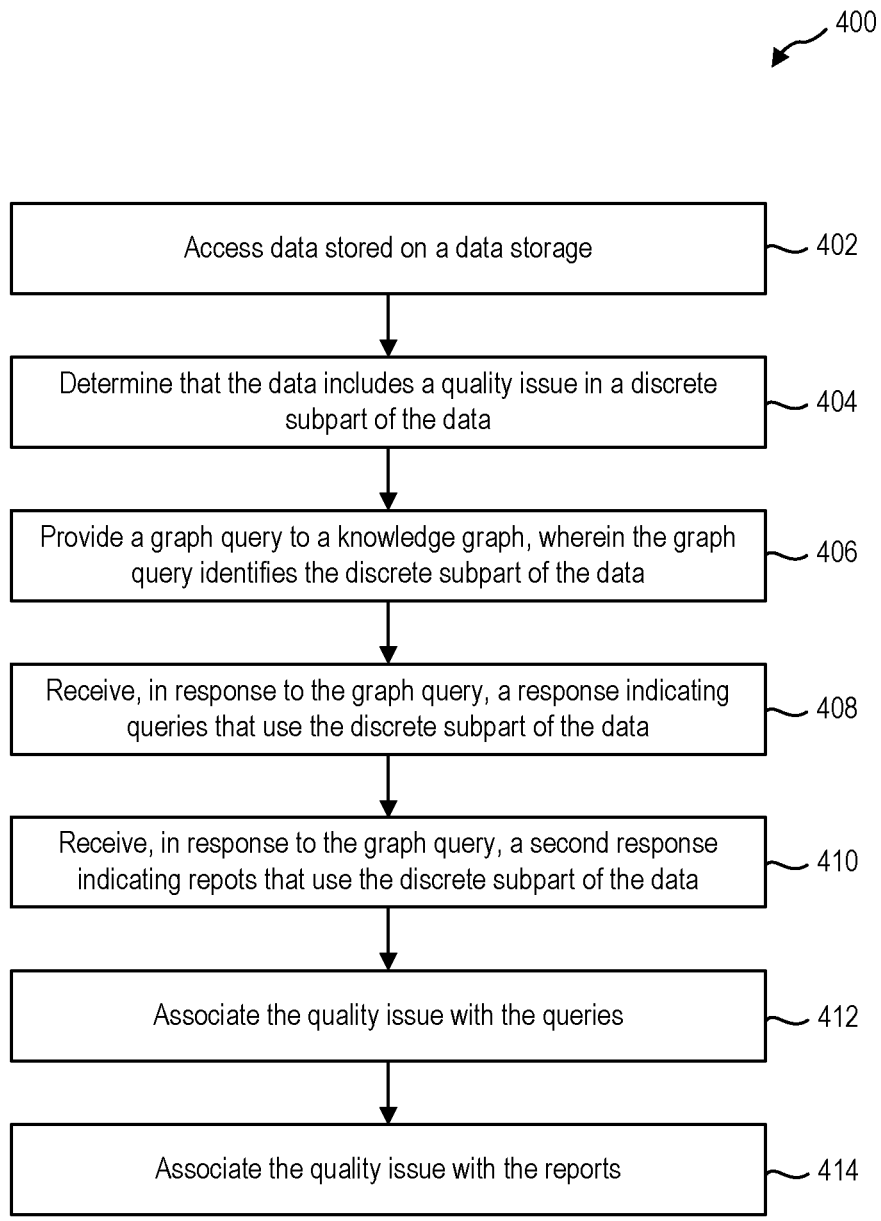
FIG. 4 illustrates an example method for associating a data quality issue with queries and reports.

FIG. 4 illustrates an example method 400 for using a knowledge graph to identify queries and reports that may be relying on data that has a quality issue.

The method 400 may include accessing 402 data stored on a data storage. Accessing 402 the data may be part of a scheduled assessment of the data. Accessing 402 the data may be in response to a notification or a request. Accessing 402 the data may include performing a quality check on the data.

The method 400 may include determining 404 that the data includes a quality issue in a discrete subpart of the data. Determining 404 that the data includes the quality issue in the discrete subpart of the data may include one or more of receiving a notification of the quality issue, detecting the quality issue during a scheduled crawl of the data, or detecting the quality issue during a requested scan of the data.

The method 400 may include providing 406 a graph query to a knowledge graph, wherein the graph query identifies the discrete subpart of the data.

The method 400 may include receiving 408, in response to the graph query, a response indicating queries that use the discrete subpart of the data.

The method 400 may include receiving 410, in response to the graph query, a second response indicating reports that use the discrete subpart of the data. The second response may be part of the first response.

The method 400 may include associating 412 the quality issue with the queries. Associating 412 the quality issue with the queries may include one or more of sending a notification to users of the queries, indicating an existence of the data quality issue on a user interface, indicating an existence of the data quality issue on a display of reports and metrics based on the queries, or notifying a system administrator that the queries may have a quality issue.

The method 400 may include associating 414 the quality issue with the reports. Associating 414 the quality issue with the reports may include one or more of sending a notification to users of the reports, indicating an existence of the quality issue on a user interface, indicating an existence of the quality issue on a display of the reports, or notifying a system administrator that the reports may have the quality issue.

Figure 5:
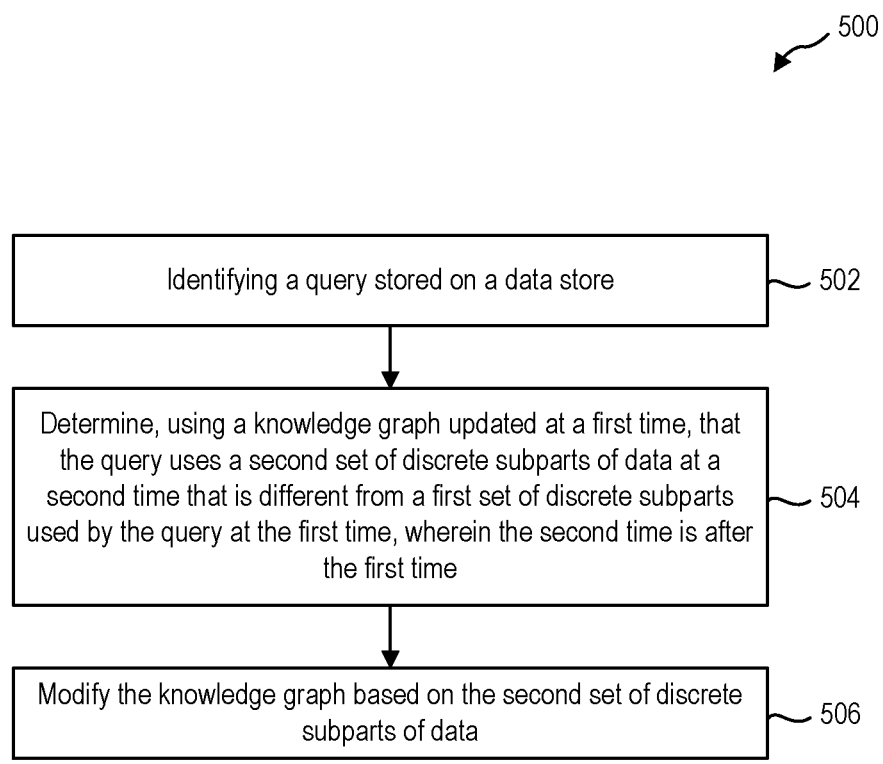
FIG. 5 illustrates an example method for updating a knowledge graph based on changes to a query.

FIG. 5 illustrates an example method 500 for updating a knowledge graph.

The method 500 may include identifying 502 a query stored on a data store. A graph builder may identify 502 the query. The graph builder may identify the query as part of a scheduled scan of the data store, as part of a requested scan of a data store, or in response to a notification of a change to the query.

The method 500 may include determining 504, using a knowledge graph updated at a first time, that the query uses a second set of discrete subparts of data at a second time that is different from a first set of discrete subparts used by the query at the first time, wherein the second time is after the first time. A query parser may determine the second set of discrete subparts based on the query. The graph builder may provide a graph query to the knowledge graph requesting a list of discrete subparts used by the query. The knowledge graph may provide, in response to the graph query, the first set of discrete subparts. The graph builder may determine that the second set of discrete subparts is different from the first set of discrete subparts.

The method 500 may include modifying 506 the knowledge graph based on the second set of discrete subparts of data. Modifying 506 the knowledge graph may include modifying connections in the knowledge graph to indicate that the query uses the second set of discrete subparts of data instead of indicating that the query uses the first set of discrete subparts of data.

Figure 6:
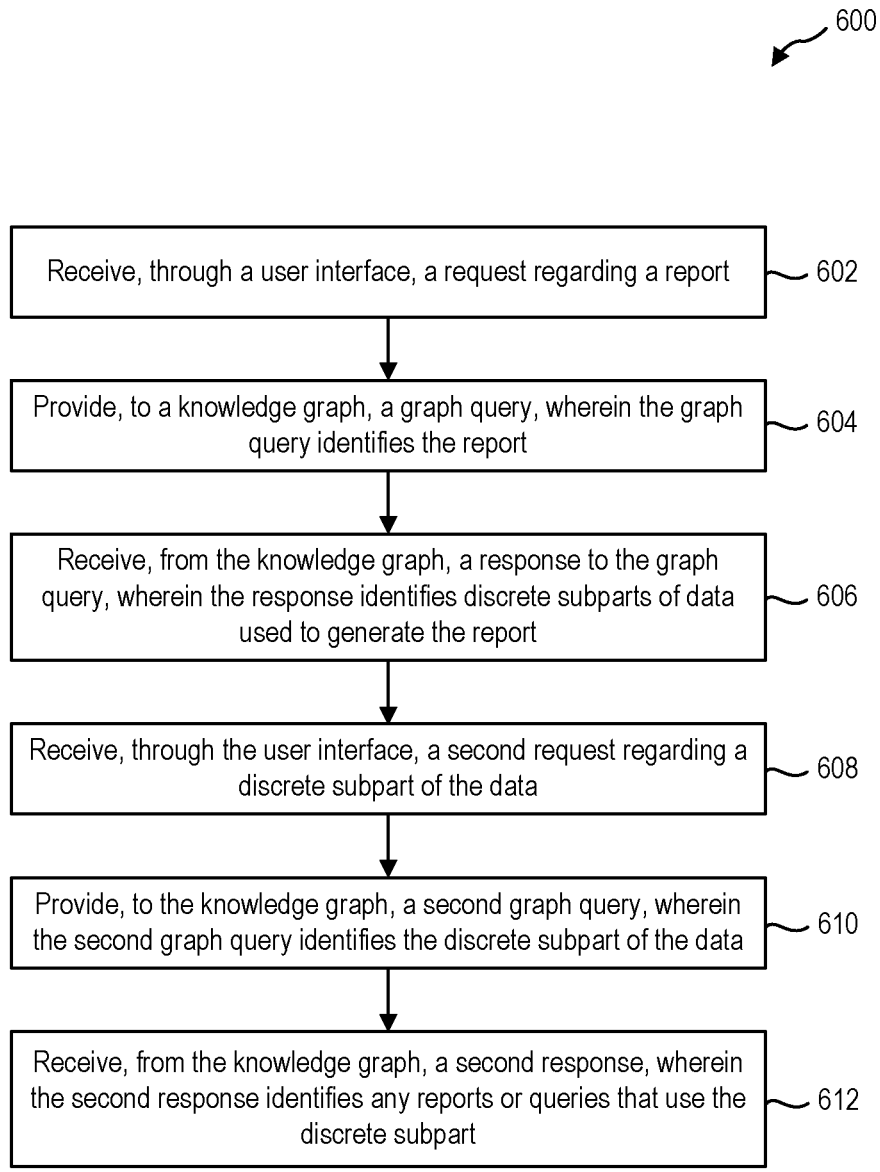
FIG. 6 illustrates an example method for querying a knowledge graph through a user interface.

FIG. 6 illustrates an example method 600 for querying a knowledge graph using a user interface.

The method 600 may include receiving 602, through a user interface, a request regarding a report. A user may use the user interface to provide the request. The user may rely on the report and want to understand what data is used to generate the report.

The method 600 may include providing 604, to a knowledge graph, a graph query, wherein the graph query identifies the report.

The method 600 may include receiving 606, from the knowledge graph, a response to the graph query, wherein the response identifies discrete subparts of data used to generate the report. The knowledge graph may include information indicating one or more queries used to generate the report. The knowledge graph may include information indicating discrete subparts of data used by the one or more queries. The response may include annotations, descriptions, or definitions associated with the discrete subparts of data used to generate the report.

The method 600 may include receiving 608, through the user interface, a second request regarding a discrete subpart of the data. A user may use the user interface to provide the second request. The user may be considering removing or modifying the discrete subpart of the data and want to understand what impact doing so may have.

The method 600 may include providing 610, to the knowledge graph, a second graph query, wherein the second graph query identifies the discrete subpart of the data.

The method 600 may include receiving 612, from the knowledge graph, a second response, wherein the second response identifies any reports or queries that use the discrete subpart. The knowledge graph may include information indicating what queries and reports, if any, use the discrete subpart. The second response may indicate that no reports or queries use the discrete subpart.

Figure 7:
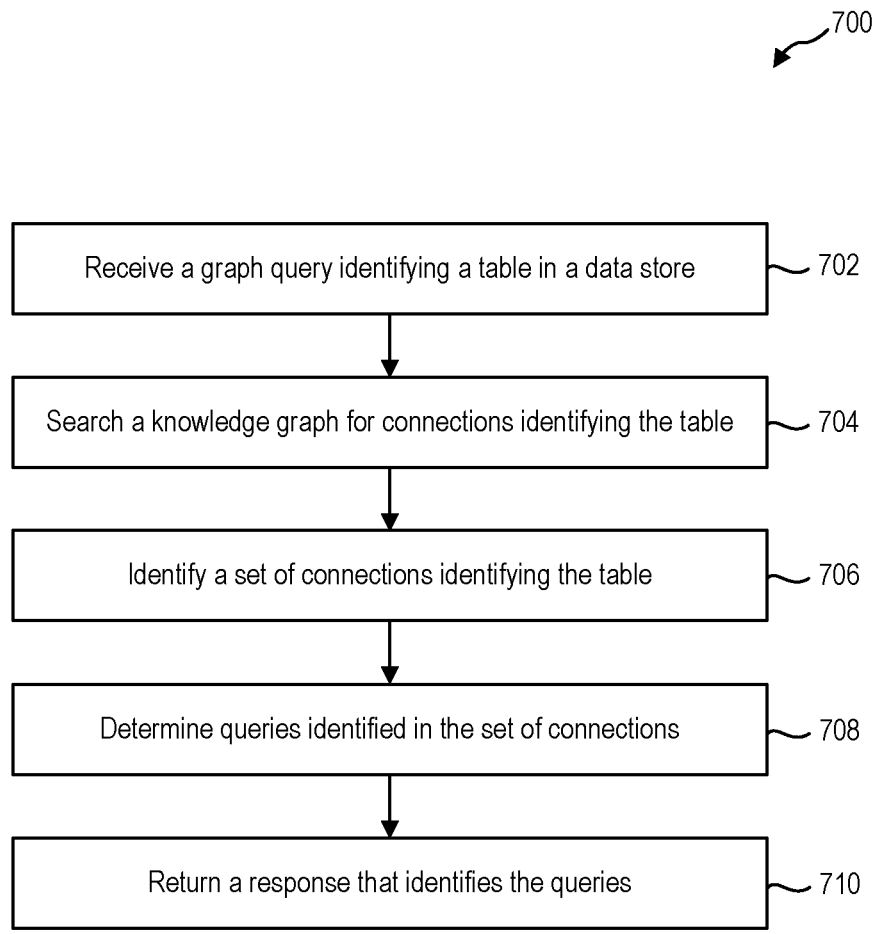
FIG. 7 illustrates an example method for using a knowledge graph to respond to a graph query.

FIG. 7 illustrates an example method 700 for responding to a graph query.

The method 700 may include receiving 702 a graph query identifying a table in a data store. A management system (such as the management system 230) may receive the graph query.

The method 700 may include searching 704 a knowledge graph for connections identifying the table. The knowledge graph may be stored on a second data store different from the data store. The knowledge graph may include one or more connections. The one or more connections may indicate connections between tables stored on the data store and queries (which may be stored on the data store or elsewhere).

The method 700 may include identifying 706 a set of connections identifying the table. The set of connections may be connections stored in the knowledge graph.

The method 700 may include determining 708 queries identified in the set of connections. The queries may be associated with reports. Determining 708 the queries may include determining any reports associated with the queries. Determining 708 the queries may include determining any business terms associated with the queries.

The method 700 may include returning 710 a response that identifies the queries. The response may also identify any reports associated with the queries. The response may also include descriptions of the queries stored in the knowledge graph. The response may include definitions stored in the knowledge graph for business terms associated with the queries.

Figure 8:
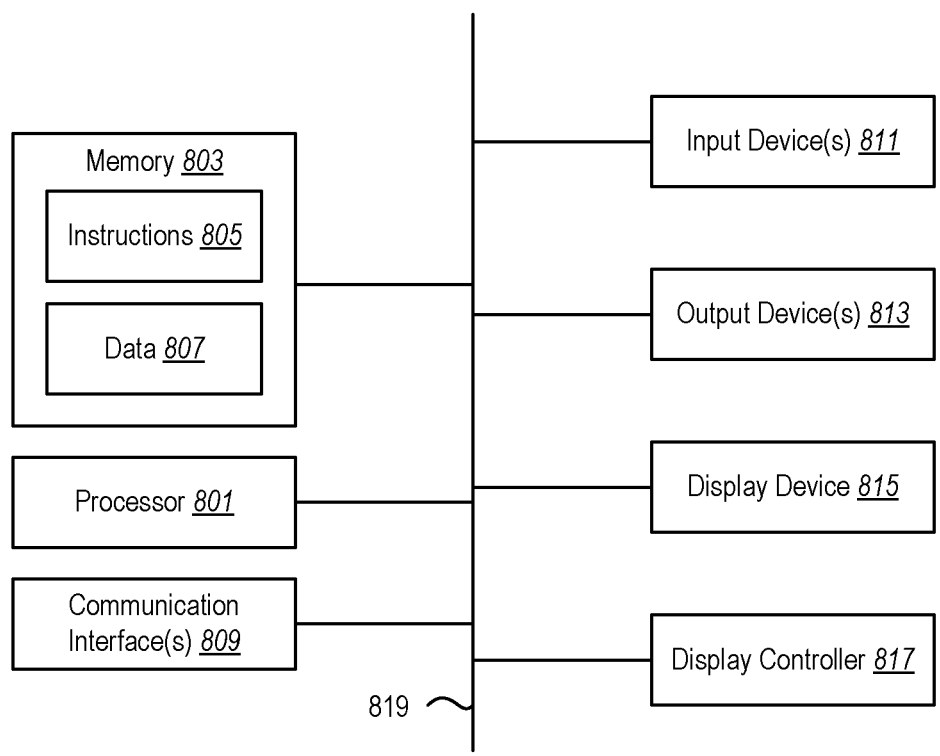
FIG. 8 illustrates certain components that can be included within a computing device.

Reference is now made to FIG. 8. One or more computing devices 800 can be used to implement at least some aspects of the techniques disclosed herein. FIG. 8 illustrates certain components that can be included within a computing device 800.

The computing device 800 includes a processor 801 and memory 803 in electronic communication with the processor 801. Instructions 805 and data 807 can be stored in the memory 803. The instructions 805 can be executable by the processor 801 to implement some or all of the methods, steps, operations, actions, or other functionality that is disclosed herein. Executing the instructions 805 can involve the use of the data 807 that is stored in the memory 803. Unless otherwise specified, any of the various examples of modules and components described herein can be implemented, partially or wholly, as instructions 805 stored in memory 803 and executed by the processor 801. Any of the various examples of data described herein can be among the data 807 that is stored in memory 803 and used during execution of the instructions 805 by the processor 801.

Although just a single processor 801 is shown in the computing device 800 of FIG. 8, in an alternative configuration, a combination of processors (e.g., an Advanced RISC (Reduced Instruction Set Computer) Machine (ARM) and a digital signal processor (DSP)) could be used.

The computing device 800 can also include one or more communication interfaces 809 for communicating with other electronic devices. The communication interface(s) 809 can be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing device 800 can also include one or more input devices 811 and one or more output devices 813. Some examples of input devices 811 include a keyboard, mouse, microphone, remote control device, button, joystick, trackball, touchpad, and lightpen. One specific type of output device 813 that is typically included in a computing device 800 is a display device 815. Display devices 815 used with embodiments disclosed herein can utilize any suitable image projection technology, such as liquid crystal display (LCD), light-emitting diode (LED), gas plasma, electroluminescence, wearable display, or the like. A display controller 817 can also be provided, for converting data 807 stored in the memory 803 into text, graphics, and/or moving images (as appropriate) shown on the display device 815. The computing device 800 can also include other types of output devices 813, such as a speaker, a printer, etc.

The various components of the computing device 800 can be coupled together by one or more buses, which can include a power bus, a control signal bus, a status signal bus, a data bus, etc. For the sake of clarity, the various buses are illustrated in FIG. 8 as a bus system 819.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, various types of storage class memory, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A non-transitory computer-readable medium comprising instructions that are executable by one or more processors to cause a computing system to:
   access data as part of an automated check for data quality issues in the data, wherein the data is stored in a first data store, wherein the first data store includes a set of queries, wherein the data includes discrete subparts that can be accessed using a query, and wherein each query in the set of queries references at least one discrete subpart of the data;
   determine that a first discrete subpart of the data has a quality issue, wherein a first query from the set of queries uses the first discrete subpart of the data, wherein a business metric is based at least in part on the first query, wherein the business metric is a measurable value that tracks organizational performance, and wherein the business metric is shown on a user interface;
   provide, in response to determining that the data has the quality issue, a graph query to a knowledge graph, wherein the graph query identifies the first discrete subpart, wherein the knowledge graph is stored in a second data store, wherein the knowledge graph indicates, for each query in the set of queries, one or more discrete subparts of the data used by the query and indicates, for each discrete subpart of the data used by the set of queries, one or more queries in the set of queries that use the discrete subpart, and wherein the knowledge graph is a graph database comprising nodes representing the discrete subparts and the set of queries and edges representing connections between the discrete subparts and the set of queries;
   receive, in response to the graph query, a response indicating that the first discrete subpart is used by the first query and that the business metric is based at least in part on the first query; and
   associate the quality issue with the business metric shown on the user interface.

2. The non-transitory computer-readable medium of claim 1, wherein the business metric measures one of active user accounts as of a certain date or during a certain period, a web traffic statistic, incremental sales, return on marketing investment, a response rate, content downloads, sales revenue, sales growth, profit margin, debt to equity ratio, customer retention rate, or social media followers.

3. The non-transitory computer-readable medium of claim 1, wherein the business metric is a key performance indicator.

4. The non-transitory computer-readable medium of claim 1, wherein the knowledge graph comprises information describing a business significance of the discrete subparts.

5. The non-transitory computer-readable medium of claim 4, wherein the nodes comprise the information describing the business significance of the discrete subparts.

6. The non-transitory computer-readable medium of claim 1, wherein the instructions that are executable by the one or more processors further cause the computing system to:
send an alert to a user of the business metric regarding the quality issue.

7. The non-transitory computer-readable medium of claim 1, wherein the user interface shows a second business metric, the second business metric is based at least in part on a second query from the set of queries and the second query uses the first discrete subpart of the data, the response to the graph query indicates that the first discrete subpart of the data is used by the second query and that the second business metric is based at least in part on the second query, and the instructions are further being executable by the one or more processors to cause the computing system to:
associate the quality issue with the second business metric.

8. The non-transitory computer-readable medium of claim 1, wherein the discrete subparts include one or more tables stored in the data.

9. The non-transitory computer-readable medium of claim 8, wherein the discrete subparts include one or more columns of the tables.

10. The non-transitory computer-readable medium of claim 8, wherein the knowledge graph includes schema annotations for the one or more tables and one or more of the schema annotations are received through the user interface.

11. The non-transitory computer-readable medium of claim 8, wherein the knowledge graph includes a node for each query in the set of queries and a node for each of the one or more tables.

12. The non-transitory computer-readable medium of claim 1, wherein the knowledge graph is stored on the second data store in a second format different from a first format in which the data is stored on the first data store.

13. The non-transitory computer-readable medium of claim 12, wherein the second format is optimized for retrieving information from the knowledge graph and the first format is optimized for retrieving information from the data.

14. A system for monitoring data quality for a report, the system comprising:
one or more processors;
memory in electronic communication with the one or more processors;
a first data store that includes data and a set of queries, wherein the data includes discrete subparts that can be accessed using a query and wherein each query in the set of queries references at least one discrete subpart of the data;
a second data store, wherein the second data store includes a knowledge graph that indicates, for each query in the set of queries, one or more discrete subparts of the data used by the query and indicates, for each discrete subpart of the data used by the set of queries, one or more queries in the set of queries that use the discrete subpart and wherein the knowledge graph is a graph database comprising nodes representing the discrete subparts and the set of queries and edges representing connections between the discrete subparts and the set of queries;
a user interface showing a business metric, wherein the business metric is based at least in part on a first query from the set of queries and the first query uses a first discrete subpart of the data and wherein the business metric is a measurable value that tracks organizational performance; and
instructions stored in the memory, the instructions being executable by the one or more processors to:
access the data as part of an automated check for data quality issues in the data;
determine that the first discrete subpart of the data has a quality issue;
provide, in response to determining that the data has the quality issue, a graph query to the knowledge graph, wherein the graph query identifies the first discrete subpart;
receive, in response to the graph query, a response indicating that the first discrete subpart is used by the first query and that the business metric is based at least in part on the first query; and
associate the quality issue with the business metric shown on the user interface.

15. The system of claim 14, wherein the discrete subparts include one or more tables.

16. The system of claim 14, wherein associating the quality issue with the business metric comprises placing a visual indicator of the quality issue on the user interface.

17. The system of claim 14, wherein the user interface shows a second business metric, the second business metric is based at least in part on a second query from the set of queries and the second query uses the first discrete subpart of the data, the response to the graph query indicates that the first discrete subpart of the data is used by the second query and that the second business metric is based at least in part on the second query, and the instructions are further being executable by the one or more processors to:
associate the quality issue with the second business metric.

18. A method for monitoring data quality for a report, the method comprising:
accessing data as part of an automated check for data quality issues in the data, wherein the data is stored in a first data store, wherein the first data store includes a set of queries, wherein the data includes discrete subparts that can be accessed using a query, and wherein each query in the set of queries references at least one discrete subpart of the data;
determining that a first discrete subpart of the data has a quality issue, wherein a first query from the set of queries uses the first discrete subpart of the data, wherein a business metric is based at least in part on the first query, wherein the business metric is a measurable value that tracks organizational performance, and wherein the business metric is shown on a user interface;
providing, in response to determining that the data has the quality issue, a graph query to a knowledge graph, wherein the graph query identifies the first discrete subpart, wherein the knowledge graph is stored in a second data store, wherein the knowledge graph indicates, for each query in the set of queries, one or more discrete subparts of the data used by the query and indicates, for each discrete subpart of the data used by the set of queries, one or more queries in the set of queries that use the discrete subpart, and wherein the knowledge graph is a graph database comprising nodes representing the discrete subparts and the set of queries and edges representing connections between the discrete subparts and the set of queries;

receiving, in response to the graph query, a response indicating that the first discrete subpart is used by the first query and that the business metric is based at least in part on the first query; and associating the quality issue with the business metric shown on the user interface.

19. The method of claim 18, wherein the discrete subparts include one or more tables.

20. The method of claim 18, wherein associating the quality issue with the business metric comprises placing a visual indicator of the quality issue on the user interface.

* * * * *